(12) United States Patent
Ronning

(10) Patent No.: US 6,307,347 B1
(45) Date of Patent: Oct. 23, 2001

(54) APPARATUS AND METHOD FOR RECHARGING A VEHICLE

(75) Inventor: Jeffrey J. Ronning, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/630,925

(22) Filed: Aug. 2, 2000

(51) Int. Cl.[7] .................................................. H02J 7/00
(52) U.S. Cl. ........................... 320/107; 320/109; 320/116
(58) Field of Search ................................... 320/108, 109, 320/116, 125, 126, 107

(56) References Cited

U.S. PATENT DOCUMENTS

| | | | |
|---|---|---|---|
| 5,583,418 | 12/1996 | Honda et al. | 320/43 |
| 5,696,367 * | 12/1997 | Keith | 235/381 |
| 5,821,728 * | 10/1998 | Schwind | 320/108 |
| 5,847,537 | 12/1998 | Parmley, Sr. | 320/2 |

* cited by examiner

*Primary Examiner*—Gregory J. Toatley, Jr.
(74) *Attorney, Agent, or Firm*—Margaret A. Dobrowitsky

(57) ABSTRACT

An apparatus for supplying an electrical charge to a vehicle having a plurality of contact members and a plurality of elastic members secured to the inner surface of the plurality of contact members at one end and a plurality of relays at the other end. The relays are suspended behind the inner surface of the plurality of contact members and the elastic members allow the plurality of relays to travel in a range defined by a first position and a second position and the relays are in a facially spaced relationship with the inner surface of the contact members when the relay is in the first position and the relays make contact with the inner surface of the contact members when the relay is the second position and a power conduit connects the plurality of relays to an electrical supply.

33 Claims, 5 Drawing Sheets

APPARATUS AND METHOD FOR RECHARGING A VEHICLE

TECHNICAL FIELD

The present invention relates to hybrid and electric vehicles. In particular, an apparatus for providing a source of current for recharging is disclosed.

BACKGROUND OF THE INVENTION

Electric vehicles have been available for many years. However, and due to certain limitations, the use of electric vehicles has been mainly in special applications. Recently, due to environmental considerations, as well as technological developments and advancements in the area of batteries, electric vehicles are gaining wider acceptance. In addition, and in certain regions of poor air quality, legislation has been adopted requiring that a percentage of new vehicles in these areas be electrically powered.

Electric vehicles have a number of advantages, including high efficiency, zero emissions, as well as being much quieter. The biggest drawback of an electric vehicle is that ultimately it must be recharged and accordingly it has a limited range. For many drivers, the range of an electric vehicle is sufficient and the vehicle's batteries can be recharged at the driver's residence or at a service location over night before the vehicle is driven again.

In addition, and due to technological advances in automotive designs as well as battery powered vehicles, hybrid vehicles with much greater ranges are being introduced. A Hybrid Vehicle is a vehicle that has at least two sources of energy. A hybrid electric vehicle (HEV) is a vehicle wherein one of the sources of energy is electric and the other source of energy may be derived from a heat engine that burns diesel, gasoline or any other source of chemical energy. Accordingly, a hybrid electric vehicle may have a much greater range before its batteries need recharging. Moreover, these vehicles are also equipped with a means for charging the batteries through their onboard internal combustion engines.

One contemplated means for recharging an electric or hybrid vehicle is an electric vehicle charging station wherein single plug devices having a system for metering time or power for billing the customer are used. These systems are expensive to install as well as operate. Another problem with current methods of charging electrical vehicles at charging stations is that the connector cables connecting the charging device to the vehicle are often exposed and difficult to handle.

A further problem with charging stations is that plug-in locations are often outdoors, exposed to the elements. Weather conditions, such as rain or snow, can impede the proper and safe operation of such electrical systems, which operate at high power levels.

The buildings or housings associated with conventional charging stations are constructed in a manner such that they are not convenient to install and to relocate in the event a change of location becomes necessary. The cost to build these structures, which are generally permanent structures, is high and most contemporary charging stations are single function units providing only charging services.

Accordingly, there is a need for a quick and convenient means for providing a source of electricity to re-charge an electrically powered automobile.

SUMMARY OF THE INVENTION

In an exemplary embodiment, a charging system provides a quick and efficient means for an operator to connect their vehicle to an electrical supply source in order to recharge their electric or hybrid electric vehicle. The charging system can be utilized at home and the vehicle operator does not have to manually connect the vehicle to a source of electric power. The operator simply positions their vehicle over the charging system of the instant application. There is no requirement for special connections or adaptations.

In addition, the system is configured for use with a common household 120 volt AC supply.

The above-described and other features and advantages of the present invention will be appreciated and understood by those skilled in the art from the following detailed description, drawings, and appended claims.

DESCRIPTION OF THE PREFERRED EMBODIMENT

Figure 1:
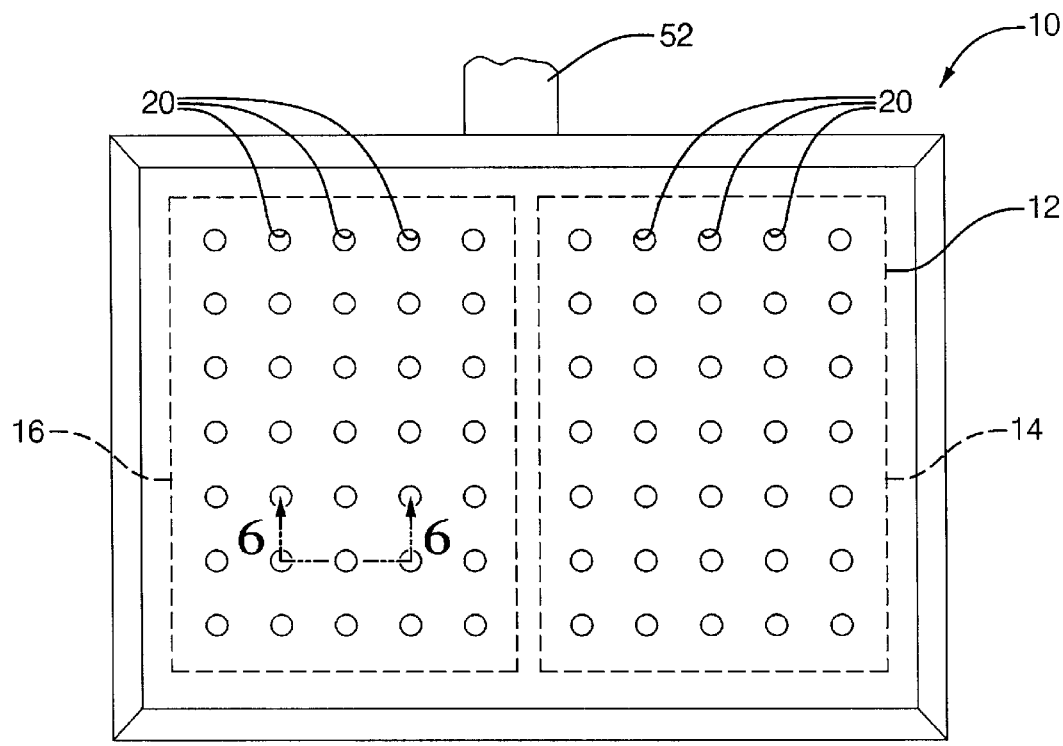
FIG. 1 is a top plan view of a charging mat constructed in accordance with the instant application.

Referring now to FIG. 1, a charge mat 10 constructed in accordance with the present invention is illustrated. Charge mat 10 has a mat 12 that is constructed out of a durable rubber compound capable of withstanding the pressure on an accidental drive over by a vehicle operator. In addition, mat 12 is also nonconductive to electricity and is able to conform to slight variations in the surface over which it is placed.

In an exemplary embodiment, mat 12 is rectangular shaped and has the following dimensions, 100 cm×80 cm. Of course, and as applications may require, these dimensions may vary. Charge mat 12 is also beveled along its periphery. This also prevents damage to mat 12 by accidental drive overs and, in addition, will reduce the likelihood of an individual tripping over mat 12.

Mat 12 also includes a pair of relay fields 14 and 16 (illustrated by the dashed lines in FIG. 1). In an exemplary embodiment, fields 14 and 16 have the following dimensions, 40 cm×50 cm. Of course, and as applications may require, these dimensions may vary. In accordance with the instant application, one of the relay fields performs the function of electrical grounding while the other supplies household AC power.

Figure 2:
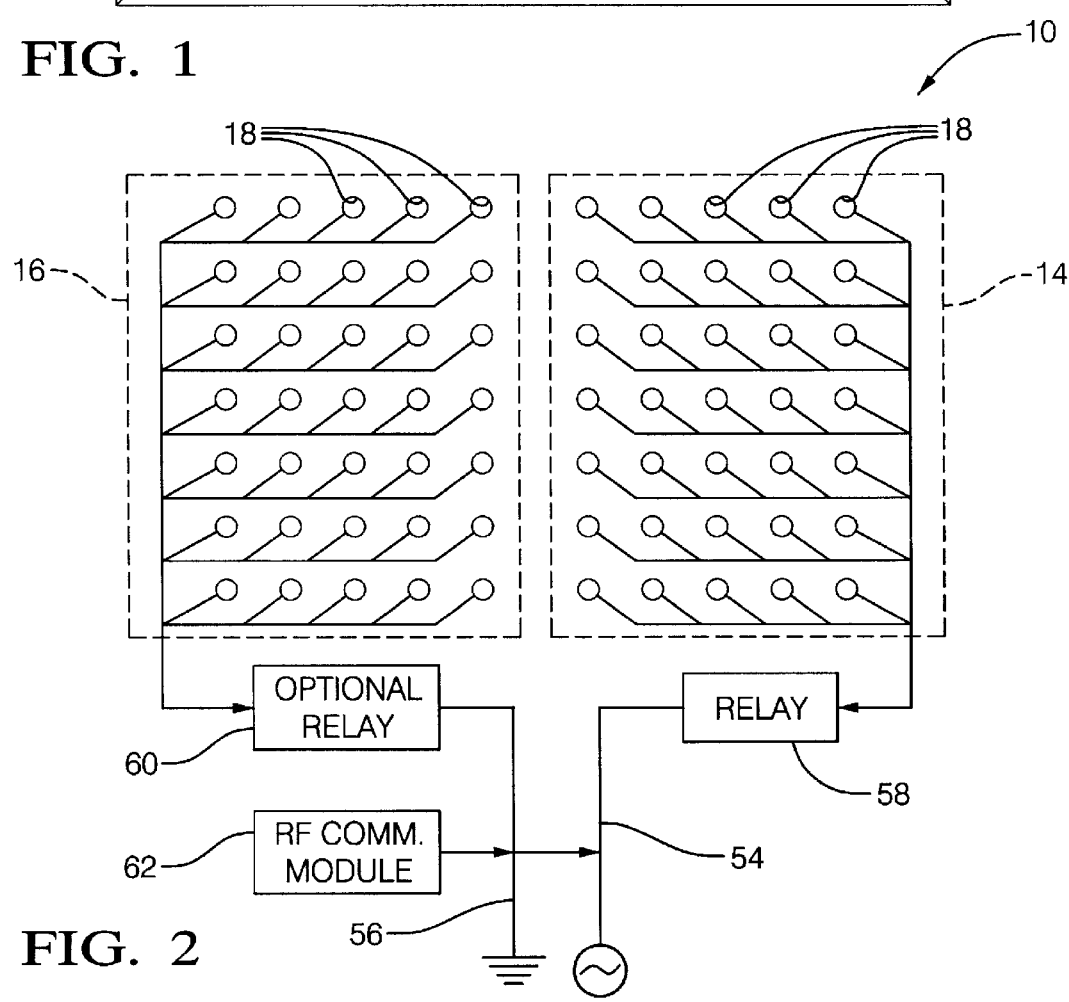
FIG. 2 is a diagrammatic view of portions of the apparatus of the instant application.
Figure 3:
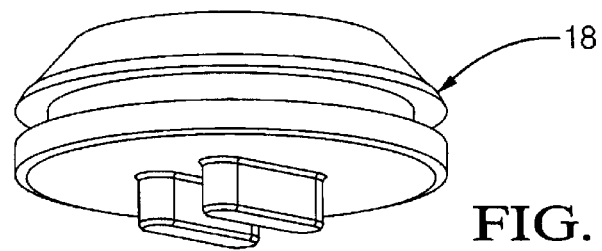
FIG. 3 is a perspective view of component parts of the apparatus of the instant application.

Referring now to FIG. 2, fields 14 and 16 each have a plurality of highly magnetic permeable slugs 18 (FIG. 3). In an exemplary embodiment, slugs 18 are iron. Of course, other materials being magnetically permeable and having conductive qualities may be used for slugs 18. Referring back now to FIG. 1, mat 12 has a plurality of openings 20. Openings 20 are positioned to lie within fields 14 and 16. A plurality of contact caps 22 (FIG. 4) are inserted into openings 20 through the underside of mat 12. In an exemplary embodiment, contact caps 22 are constructed out of magnetic stainless steel.

Figure 4A:
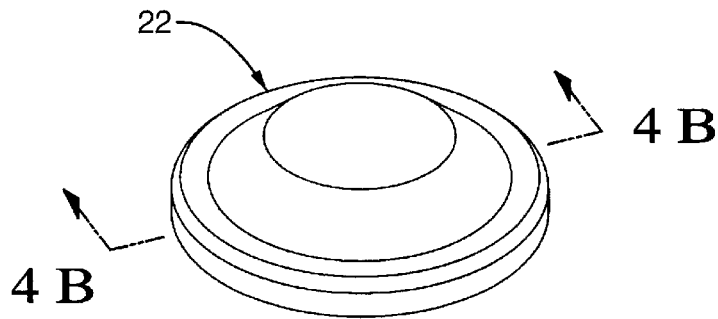
FIG. 4 is a perspective view of component parts of the apparatus of the instant application.
Figure 4B:
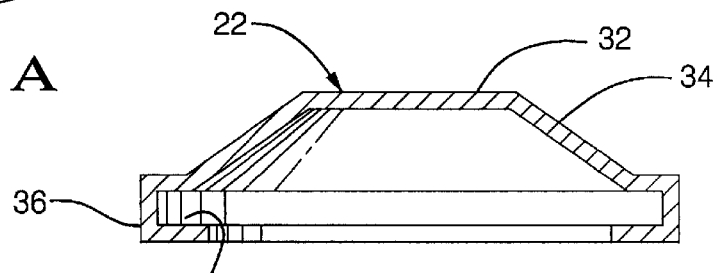
Figure 5:
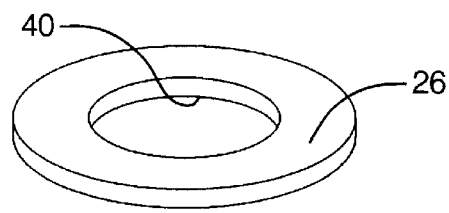
FIG. 5 is a perspective view of component parts of the apparatus of the instant application.

Referring now to FIGS. 3–6, slugs 18 are configured to have a channel 24 disposed about the periphery of slugs 18. Channel 24 is configured to receive an elastomeric spring 26 (FIG. 5).

Figure 6:
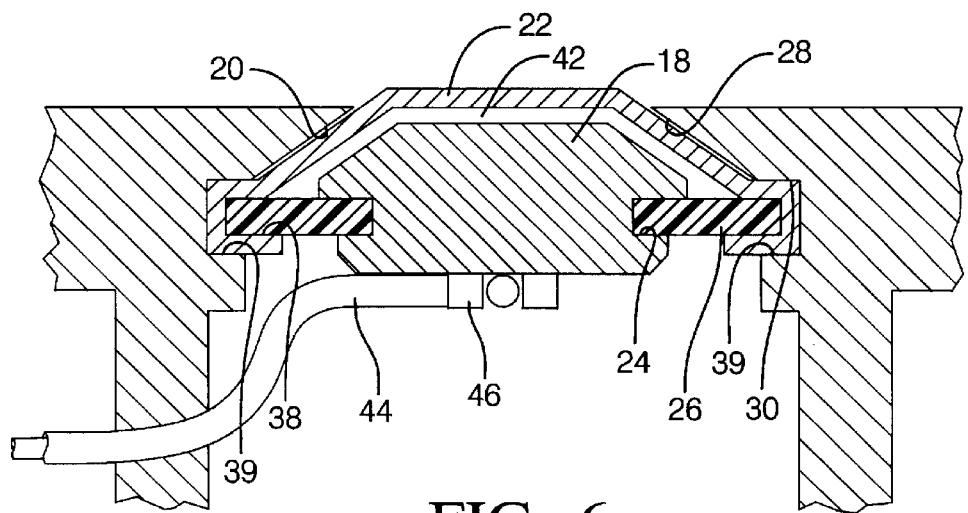
FIG. 6 is a cross-section of view along lines 6—6 of FIG. 1.

Each opening 20 is configured to tapered wall portion 28 and a receiving area 30 (FIG. 6). Each cap 22 is configured to have an engagement surface 32, an inclined portion 34, a securement portion 36 and a receiving area 38 (FIG. 4).

Referring now to FIG. 6, contact caps 22 are inserted into openings 20. The configuration of contact caps 22 allows engagement surface 32 and a portion of inclined surface 34 to extend out through opening 20. Securement portion 36 is engaged and received within receiving area 30, and the remaining portion of inclined surface 34 that does not extend through opening 20 makes contact with tapered wall portion 28 of opening 20. In an exemplary embodiment, contact caps 22 are inserted into openings 20 and a retaining portion 39 is filled and behind contact cap 22. Retaining portion 39 secures contact cap 22 in position.

As an alternative, retaining portion 39 is inserted and placed behind contact cap 22. Retaining portion 39 can be configured to have a snap fit with mat 12. Alternatively, retaining portion 39 may be secured to mat 12 with an adhesive. In yet another alternative, retaining portion 39 may be configured to be part of mat 12 and flexible enough to allow for the insertion of contact cap 22 within opening 20. In addition, contact caps 22 may also be flexible enough to allow for the securement of contact caps 22 within opening 20.

Each Elastomeric spring 26 has an inner opening 40 which is sufficiently large enough to allow the bottom portion of slugs 18 to pass through (FIG. 5). Elastomeric spring 26 is engaged within channel 24 of slugs 18. As slugs 18 are inserted into contact caps 22, the outer periphery of elastomeric spring 26 is engaged within receiving area 38 of contact caps 22.

In this configuration, slugs 18 are suspended beneath contact caps 22 and an insulating airgap 42 is maintained between slugs 18 and contact caps 22. Each slug is configured to have a wire 44 connected to a slug terminal 46. Wire 44 connects slug 18 to either an AC power supply or an electrical ground depending upon which relay field slug 18 is positioned in.

Figure 7:
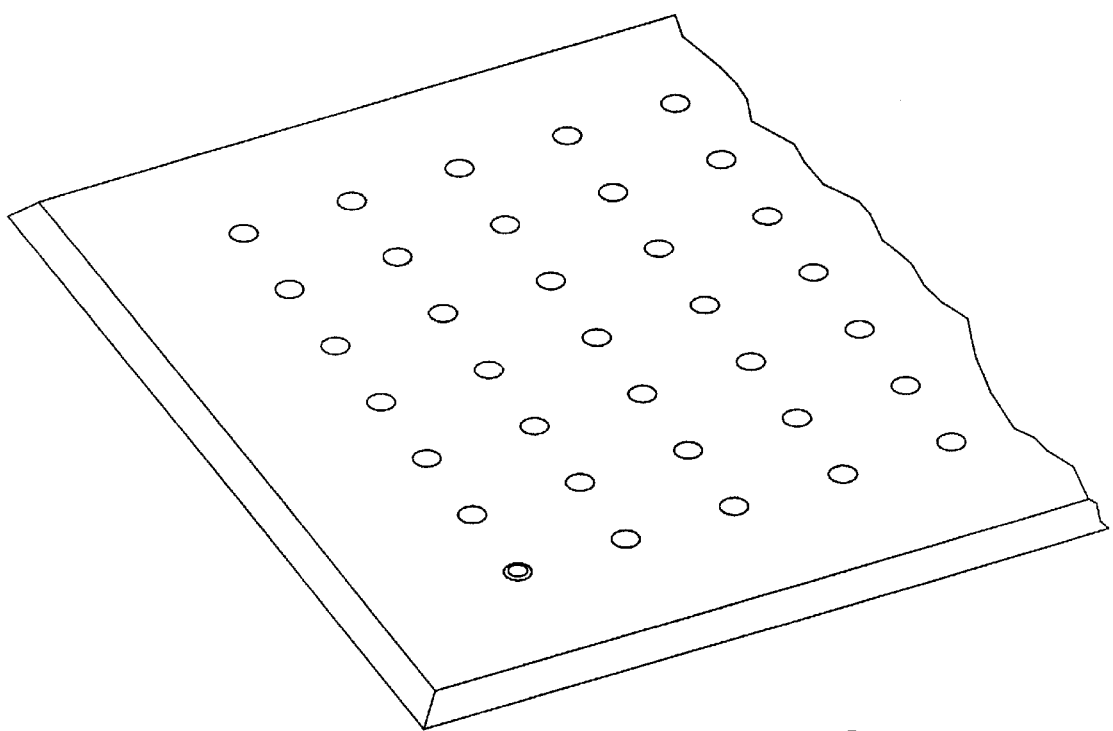
FIG. 7 is a perspective view of component parts of the apparatus of the instant application.
Figure 8:
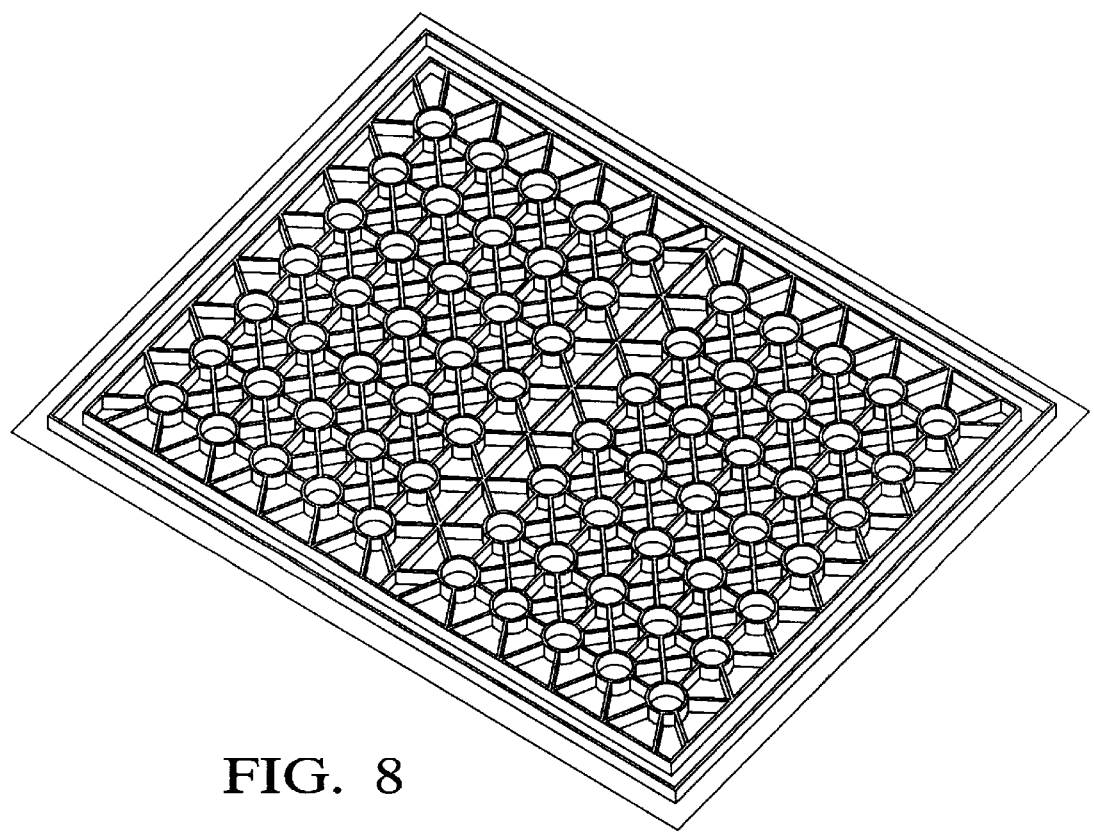
FIG. 8 is a perspective view of the lower portion of a charging mat of the instant application.
Figure 9:
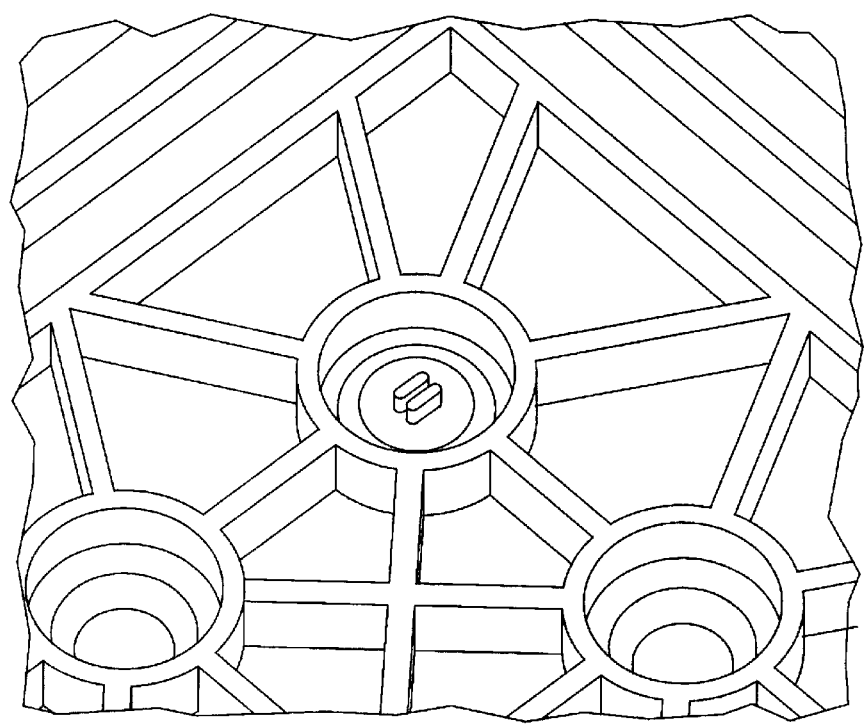
FIG. 9 is a perspective view of component parts of the apparatus of the instant application.

FIGS. 7–9 illustrate the top and bottom of charge mat 12 including openings 20 and a perspective view of slug 18 inserted into opening 20.

Figure 10:
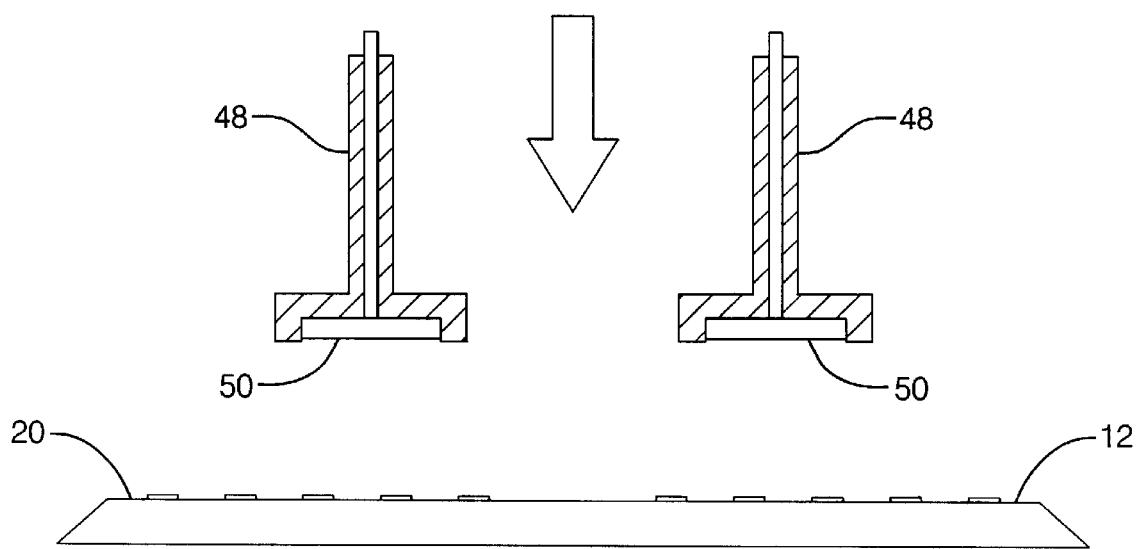
FIG. 10 is a side elevation of view illustrating operation of the instant application.

Referring now to FIG. 10, as a vehicle (not shown) drives over charge mat 12, a pair of contact pads 48 descend downwardly from the vehicle and make contact with at least one contact cap 20 of each field. In an exemplary embodiment, contact pads 48 are configured and dimensioned to have a surface area large enough to make contact with at least one or a maximum of four contact caps of each field. This allows contact pads 48 to make contact with at least one contact cap regardless of the positioning of the contact pad with respect to charge mat 12. In an exemplary embodiment, the dimensions of contact pads 48 are 100 mm×120 mm. Of course, and as applications may require, pads 48 can be configured to make contact with a lesser or larger amount of caps 22 as long as pads 48 still make contact with at least one contact cap.

Figure 11:
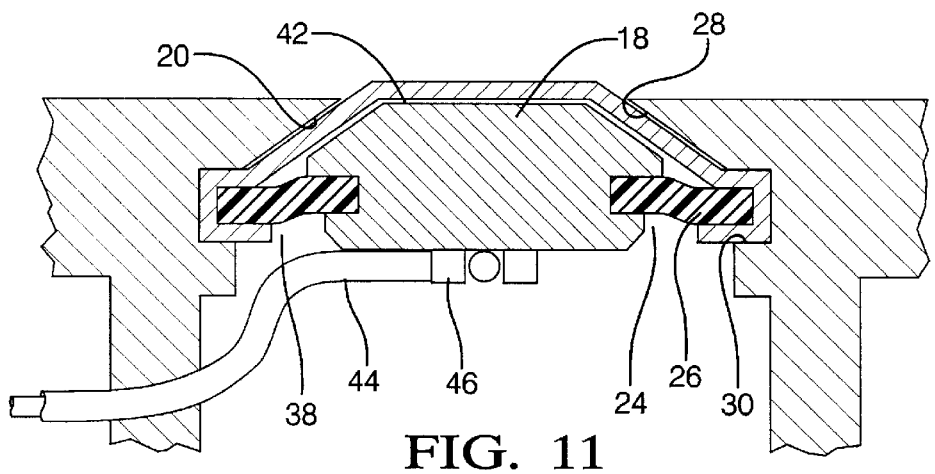
FIG. 11 is a cross-sectional view illustrating operation of the instant application.

Referring now to FIGS. 10 and 11, each contact pad 48 has an electromagnet 50 positioned on the lower surface of contact pads 48. Once the electromagnets make contact with contact caps 20, the electromagnets activate and generate a magnetic force which will draw slug relays 18 towards contact cap 20 so that a portion of relay slug 18 makes contact with contact cap 20. In this configuration charge mat 10 is now ready to supply an electrical charge to the contact pads of a vehicle.

Referring back now to FIGS. 1 and 2, field 14 is connected to an AC current supply through a power cord 52. Power cord 52 has an AC supply line 54 and a ground line 56. AC supply line 54 is connected to field 14 and ground line 56 is connected to field 16. A relay 58 connects supply line 54 to field 14. In addition, and as an alternative, an optional relay 60 can be positioned along ground line 56 to connect ground line 56 to field 16. The incorporation of an optional relay will prevent field 16 from being electrically charged through the inadvertent reverse polarity connection of power cord 52 into an electrical outlet. In an exemplary embodiment, power cord 52 is configured to be plugged into a typical North American AC outlet supplying 110–120. Of course, and as applications vary, power cord 52 and charge mat 10 can be configured to accept higher or even lower voltage electrical sources. Moreover, and in international applications, charge mat 10 and power cord 52 can be configured to accommodate variations in electrical supply systems.

A radio frequency communications module 62 is connected to supply line 54 and ground line 56. In addition, module 62 is configured to supply relays 58 and 60 with commands which will connect their respective lines to their respective fields.

Accordingly, and as the charging pads descend from a vehicle, the vehicle sends out a radio frequency signal to connect relays 58 and 60 after the charging pads have descended and made contact with at least one charging cap 22 to each field. Once the signal is received by module 62, the module instructs relays 58 and 60 to close, and thus charging commences.

After the vehicle charging is complete, the vehicle sends out a radio frequency signal to instruct module 62 to disconnect relays 58 and 60. Accordingly, and through the use of module 62 and relays 58 and 60, no electrical power is supplied to charge mat 10 until the contact pads of a vehicle are in place. In addition, the contact pads of the vehicle draw the relay slugs upwardly until a portion of the relay slug makes contact with the contact cap prior to the supply of an electrical current to the slugs. The process of drawing up the relay slugs and the contact of the contact pads to the contact cap prior to the connection of an electrical supply to charge mat 10 prevents any arcing at the point of contact. This will prevent damage to contact caps 22 and relay slugs 18.

Figure 12:
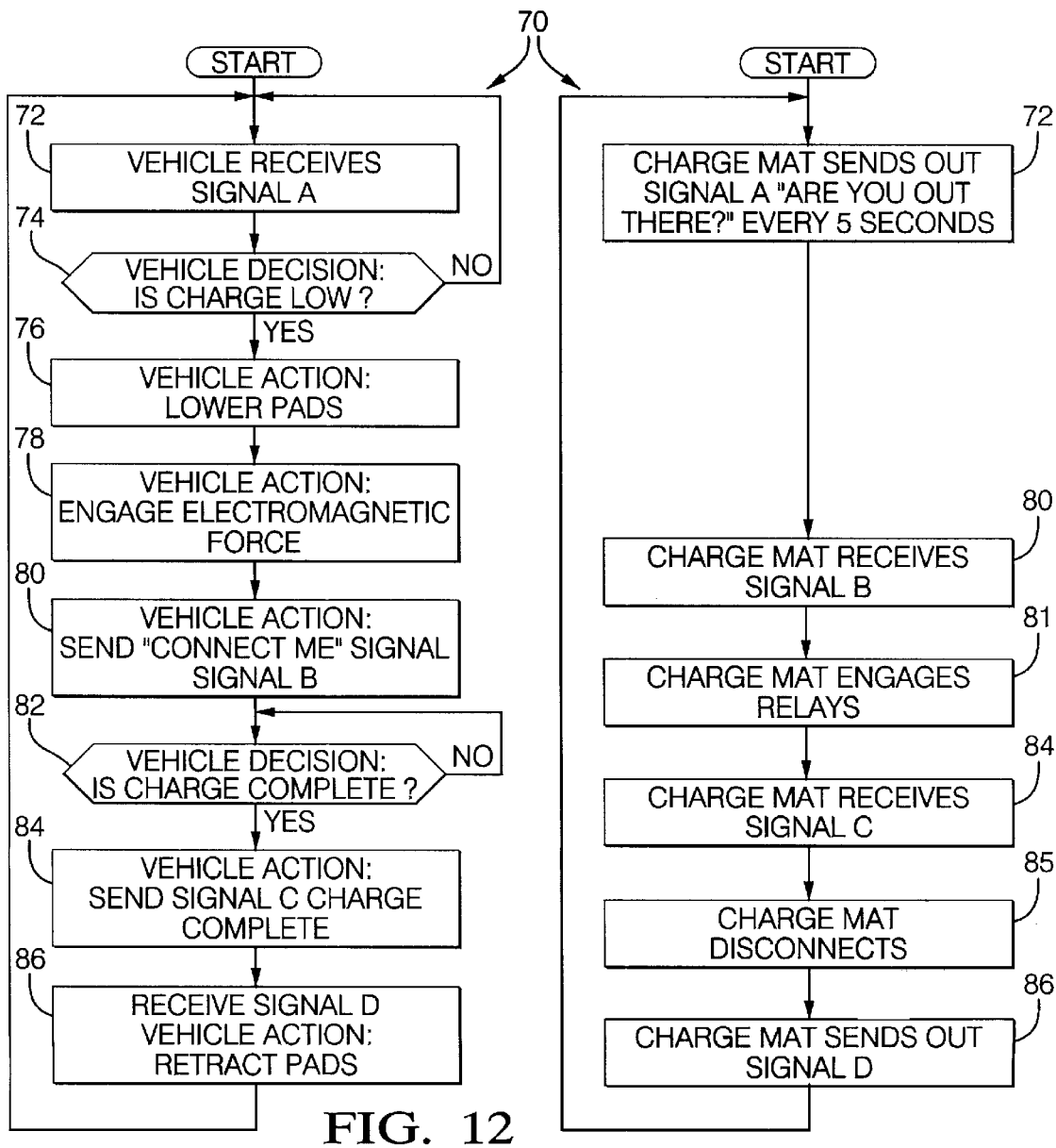
FIG. 12 is a flowchart illustrating portions of a command sequence for the charging system of the present invention.

Referring now to FIG. 12, a pair of flowcharts 70 illustrates portions of a command sequence for the charge mat operation protocol. The flow charts illustrate the command sequence and operation protocol for the vehicle and the charge mat. In an exemplary embodiment, a computer algorithm resident upon a microprocessor within the vehicle will perform portions of the command sequence illustrated in FIG. 12. Communications module 62 in response to commands from the vehicle interface system also performs portions of the command sequence illustrated in FIG. 12.

As an alternative, a computer algorithm and a microprocessor may also be located within communications module 62 in order to perform portions of the command sequence illustrated in FIG. 12.

Communications module 62 of charge mat 10 sends out a signal A which searches for a vehicle interface system. Signal A is preferably sent out in five second intervals. Of course, this time limit or parameter may vary. Once a vehicle operator has positioned the front end of their vehicle over charge mat 10 and the operator places the vehicle in "Park" mode, the vehicle interface system will receive signal A from charge mat 10. This is designated by a step 72 in flowcharts 70.

Once a signal has been received by the vehicle interface system, a decision node 74 evaluates the vehicle's charge condition and determines whether a charge is necessary. If so, step 76 instructs contact pads 48 to be lowered until electromagnets 50 make contact with at least one contact cap 20 of each field. Once contact has been made, a step 78 engages the electromagnets of the vehicle interface system and the magnetic field at contact pad 48 will draw local relay slugs 18 upward until a portion of slugs 18 makes contact with contact cap 22.

Once this has been accomplished, a step 80 instructs the vehicle interface system to send out an enable AC signal (signal B). Signal B is received by communications module 62 of charge mat 10, and communication module 62 instructs relay 58 and, if installed, relay 60 to close, effectively completing the circuit of charge mat 10 wherein electrical power is now supplied to the vehicle interface system. This is accomplished by a step 81.

Within the vehicle interface system, a decision node 82 determines whether the charging sequence is complete. This is accomplished by accessing the current state charge of the vehicle's battery system. If the charge is complete, a step 84 sends out a charge complete signal (signal C). Signal C is received by communications module 62 of charge mat 10 and relays 58 and 60 are opened. This is illustrated by a step 85. Once relays 58 and 60 are opened, communication module 62 sends out a retract signal D and once signal D is received by the vehicle interface system, a step 86 instructs the pads to retract.

As an alternative, the vehicle interface system is equipped with a charge tapering system wherein the charging current is tapered off as the completion of a charge is approached to ensure battery cell voltage uniformity.

The charge mat of the instant application allows a vehicle operator to recharge an electric or hybrid electric vehicle by performing no unnecessary tasks other than parking their vehicle in a garage or other place of overnight storage. The user simply locates the charge mat in an area where the vehicle is parked for extended periods such as overnight parking. The charge mat is normally kept plugged into a conventional 110–120 volt AC outlet and the user simply aligns the vehicle and its retractable charging pads (located in the front, midsection or rear portion of the vehicle) and places the automobile in park.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for supplying an electrical charge to a vehicle, comprising:
   a) a structure having a plurality of openings;
   b) a plurality of contact members each having an outer surface and an inner surface, said plurality contact members being inserted into said plurality of openings wherein a portion of said outer surface extends outwardly from said structure;
   c) a plurality of elastic members being secured to said inner surface of said plurality of contact members at one end and a plurality of relays at the other end, said relays being suspended behind said inner surface of said plurality of contact members and said elastic members allowing said plurality of relays to travel in a range defined by a first position and a second position, said relays being in a facially spaced relationship with said inner surface of said contact members when said relay is in said first position and said relay making contact with said inner surface of said contact members when said relay is in said second position; and
   d) a power conduit connecting said plurality of relays to an electrical supply.

2. The apparatus as in claim 1, wherein said structure is a planar member constructed out of a nonconductive material.

3. The apparatus as in claim 2, wherein said structure has a substantially small profile.

4. The apparatus as in claim 1, wherein said elastic members are a plurality of elastomeric springs.

5. The apparatus as in claim 4, wherein said elastomeric springs each have an inner opening and said plurality of relays each have a receiving area for receiving a portion of said elastomeric spring in close proximity to said inner opening.

6. The apparatus as in claim 5, wherein the periphery of said elastomeric springs is received into a receiving area being configured, dimensioned and positioned on the inner surface of said plurality of contact members.

7. The apparatus as in claim 6, wherein said plurality of contact members and said plurality of relays are constructed out of a material having conductive properties.

8. The apparatus as in claim 7, wherein said plurality of openings are configured and positioned to define two areas representing a charging field and a grounding field.

9. The apparatus as in claim 8, wherein each relay of said charging field is electrically coupled to a conduit configured for connection to an electrical supply.

10. The apparatus as in claim 9, wherein each relay of said grounding field is electrically coupled to a conduit configured for connection to an electrical supply.

11. The apparatus as in claim 8, wherein each of said areas is coupled to an electrical supply through a relay.

12. The apparatus as in claim 8, wherein said charging area is coupled to an electrical supply through a relay.

13. An apparatus for supplying an electrical charge to a vehicle, comprising:
   a) a nonconductive structure having a plurality of openings;

b) a plurality of contact members each having conductive qualities, an outer surface and an inner surface, said plurality contact members being inserted into said plurality of openings wherein a portion of said outer surface extends outwardly from said structure;

c) a plurality of nonconductive elastic members being secured to said inner surface of said plurality of contact members at one end and a plurality of relays at the other end, said relays being suspended behind said inner surface of said plurality of contact members and said elastic members allowing said plurality of relays to travel in a range defined by a first position and a second position, said relays being insulated from said inner surface of said contact members when said relay is in said first position and said relay making contact with said inner surface of said contact members when said relay is in said second position; and d) a power conduit connecting said plurality of relays to an electrical supply.

14. A method for recharging a vehicle, comprising:

a) positioning said vehicle over a charging device;

b) lowering an electrical coupling device for making contact with a portion of said charging device;

c) completing an electrical path through the use of a magnetic field;

d) instructing said charging device to connect to a source of electrical power; and e) instructing said charging device to disconnect from said source of electrical power when a recharging cycle is complete.

15. A method for recharging the batteries of a vehicle, comprising:

a) positioning said vehicle over a charging device;

b) sending out a first signal, said first signal being sent out by a communication module of said charging device;

c) receiving said first signal, said first signal being received by a vehicle interface system on said vehicle;

d) determining whether the charge of said vehicle's batteries are low;

e) lowering a pair of contact pads from said vehicle, said contact pads being capable of receiving and supplying a charging current to the batteries of said vehicle;

f) engaging an electromagnetic force in order to draw at least one relay from a pair of relay fields, said relays being drawn from a first position to a second position, said relays being capable of conducting an electrical current from said relay to one of said pair of contact pads when said relays are in said second position;

g) sending out a second signal, said second signal being received by said communication module and instructs said communication module to connect said relay fields to an electrical supply;

h) determining whether the charge of the vehicle's batteries is complete;

i) sending out a third signal, said third signal being received by said communication module and instructs said communication module to disconnect said relay fields from said electrical supply; and j) sending out a fourth signal, said fourth signal being received by said vehicle interface system and said vehicle interface system instructs said contact pads to be retracted.

16. An apparatus for supplying an electrical charge to a vehicle, comprising:

a) a structure having a pair of relay fields, one of said relay fields supplying AC power and the other providing an electrical ground;

b) a plurality of contact members each having an outer surface and an inner surface, said plurality contact members being configured, dimensioned and positioned within each of said relay fields;

c) a plurality of relays being configured, dimensioned and positioned for movement between a first position and a second position, said relays being capable of conducting a current through said relay to said contact members when said relay is in said second position; and d) a power conduit connecting said plurality of relays to an electrical supply.

17. The apparatus as in claim 16, further comprising:

e) a communications module for sending and receiving signals, said communications module connecting and disconnecting said relays from said power conduit in response to signals received by said communications module.

18. The apparatus as in claim 17, further comprising:

f) a vehicle interface system for sending and receiving signals, said vehicle interface system instructing a pair of contact pads to descend and make contact with said structure when said vehicle interface system receives a signal from said communications module.

19. The apparatus as in claim 18, wherein said vehicle interface system activates an electromagnet in said contact pads, said electromagnets draw at least one of said relays to said second position.

20. The apparatus as in claim 19, wherein said vehicle interface system sends a signal to said communications module after said vehicle interface system has activated said electromagnets.

21. The apparatus as in claim 20, wherein said vehicle interface system determines whether said batteries of said vehicle are charged.

22. The apparatus as in claim 21, wherein said vehicle interface system employs a computer algorithm resident upon a microprocessor.

23. The apparatus as in claim 21, wherein said vehicle interface system sends a disconnect signal to said communications module after the charge of said batteries is complete, said communications module disconnects said relays from said power supply after receiving said disconnect signal.

24. The apparatus as in claim 23, wherein said communications module sends out a power off signal after said relays are disconnected from said power supply, said vehicle interface system retracts said contact pads after it has received said power off signal.

25. A vehicle and apparatus for supplying an electrical charge to a battery of said vehicle, comprising:

a) a structure having a pair of relay fields, one of said relay fields supplying AC power and the other providing an electrical ground;

b) a pair of contact pads being configured and dimensioned to move in a range defined by a retracted position and an extended position, said contact pads being capable of conducting an electrical current to said battery;

c) a plurality of relays being positioned in each of said relay fields, said relays being configured, dimensioned and positioned for movement between a first position and a second position, said relays being capable of conducting a current through said relay to said contact pads when said relay is in said second position; and d) a power conduit connecting said plurality of relays to an electrical supply.

26. The apparatus as in claim 25, further comprising:

e) a plurality of contact members each having an outer surface and an inner surface, said plurality contact members being inserted into a plurality of openings in said structure wherein a portion of said outer surface extends outwardly from said structure;

f) a plurality of elastic members being secured to said inner surface of said plurality of contact members at one end and said plurality of relays at the other end, said relays being suspended behind said inner surface of said plurality of contact members and said elastic members allowing said plurality of relays to travel in a range defined by said first position and said second position, said relays being in a facially spaced relationship with said inner surface of said contact members when said relay is in said first position and said relay making contact with said inner surface of said contact members when said relay is in said second position.

27. The apparatus as in claim 26, wherein said contact pads each have an electromagnet for generating an electromagnetic force, said electromagnetic force being capable of drawing said relays to said second position.

28. The apparatus as in claim 27, wherein said structure further comprises:

i) a communications module for sending and receiving signals, said communications module being capable of opening and closing a connecting relay for each of said relay fields, said relay fields being disconnected from said power conduit when said connecting relay is in an open position.

29. The vehicle and apparatus as in claim 25, further comprising e) a vehicle interface system for sending and receiving signals, said vehicle interface system instructing said contact pads to detract or extend; and f) a communication module for sending and receiving signals, said mutations module connecting and disconnecting said relays to said power conduit.

30. An apparatus for supplying an electrical charge to a vehicle, comprising:

a) a planar member having a plurality of contact members each having an outer surface and an inner surface, a portion of said outer surface extends outwardly from said planar member; and b) a plurality of relays being coupled to an electrical supply and being suspended behind said inner surface of said plurality of contact members, said plurality of relays being configured and dimensioned to travel in a range defined by a first position and a second position, said relays being in a facially spaced relationship with said inner surface of said contact members when said relay is in said first position and said relay making contact with said inner surface of said contact members when said relay is in said second position.

31. The apparatus as in claim 30, wherein said plurality of relays are configured into a pair of relay fields each having a plurality of relays, one of said pair of relay fields being coupled to said electrical supply to provide a source of power while the other one of said pair of relay fields being coupled to said electrical supply to provide a ground.

32. The apparatus as in claim 30, wherein said planar member has nonconductive qualities.

33. A method for recharging batteries rechargeable batteries of a vehicle, comprising:

positioning said vehicle over a charging device;

sending out a first signal, said first signal being sent out by a communication module of said charging device;

receiving said first signal, said first signal being received by a vehicle interface system on said vehicle, said vehicle interface system determines whether the charge of said vehicle's rechargeable batteries are below a pre-determined level, if so said vehicle interface system instructs a pair of contact pads to be lowered from said vehicle, said contact pads being capable of receiving and supplying a charging current to the rechargeable batteries of said vehicle;

engaging an electromagnetic force in order to draw at least one relay from a pair of relay fields, said relays being drawn from a first position to a second position, said relays being capable of conducting an electrical current from said relay to one of said pair of contact pads when said relays are in said second position;

sending out a second signal, said second signal being sent by said vehicle interface system and is received by said communication module, said second signal instructs said communication module to connect said relay fields to an electrical supply;

determining whether the charge of the rechargeable batteries is complete;

sending out a third signal, said third signal being sent by said vehicle interface system and is received by said communication module and instructs said communication module to disconnect said relay fields from said electrical supply; and sending out a fourth signal, said fourth signal being sent by said communication module and is received by said vehicle interface system and said vehicle interface system instructs said contact pads to be retracted.

* * * * *